United States Patent

Whitebay et al.

[11] Patent Number: 5,232,048
[45] Date of Patent: Aug. 3, 1993

[54] WELL SCREEN WITH INCREASED OUTER SURFACE AREA

[75] Inventors: Lee E. Whitebay; Nobuo Morita, both of Ponca City, Okla.

[73] Assignee: Conoco Inc., Ponca City, Okla.

[21] Appl. No.: 829,797

[22] Filed: Jan. 31, 1992

[51] Int. Cl.$^5$ .............................................. E21B 43/08
[52] U.S. Cl. .................................. 166/228; 166/236; 210/497.01
[58] Field of Search .................. 166/228, 236, 278; 210/497.01

[56] References Cited

U.S. PATENT DOCUMENTS

| | | | |
|---|---|---|---|
| 2,257,344 | 9/1941 | Maloney | 166/236 |
| 2,877,852 | 3/1959 | Bashara | 166/236 |
| 3,133,595 | 5/1964 | Loughney et al. | 166/236 |
| 3,321,088 | 5/1967 | Williamitis | 210/497.01 |
| 3,768,557 | 10/1973 | Spurlock et al. | 166/228 |
| 4,064,938 | 12/1977 | Fast | 166/236 |
| 4,406,326 | 9/1983 | Wagner | 166/236 |
| 4,487,259 | 12/1984 | McMichael, Jr. | 166/228 |
| 4,649,996 | 3/1987 | Kojicic et al. | 166/236 |
| 4,811,790 | 3/1989 | Jennings, Jr. et al. | 166/236 |
| 4,821,800 | 4/1989 | Scott et al. | 166/236 |
| 4,917,183 | 4/1990 | Gaidry et al. | 166/278 |
| 4,950,394 | 8/1990 | Bernhardt et al. | 166/236 |
| 4,969,518 | 11/1990 | Schmitt et al. | 166/236 |

Primary Examiner—Ramon S. Britts
Assistant Examiner—Frank S. Tsay
Attorney, Agent, or Firm—Richard W. Collins

[57] ABSTRACT

A prepacked well screen assembly for preventing sand from being produced with well fluids. The assembly includes a filter medium surrounded by an outer support, with the outer surface of the filter medium being fluted or otherwise shaped to have a larger outer surface area than the surface area of the outer support member surrounding the filter medium.

5 Claims, 1 Drawing Sheet

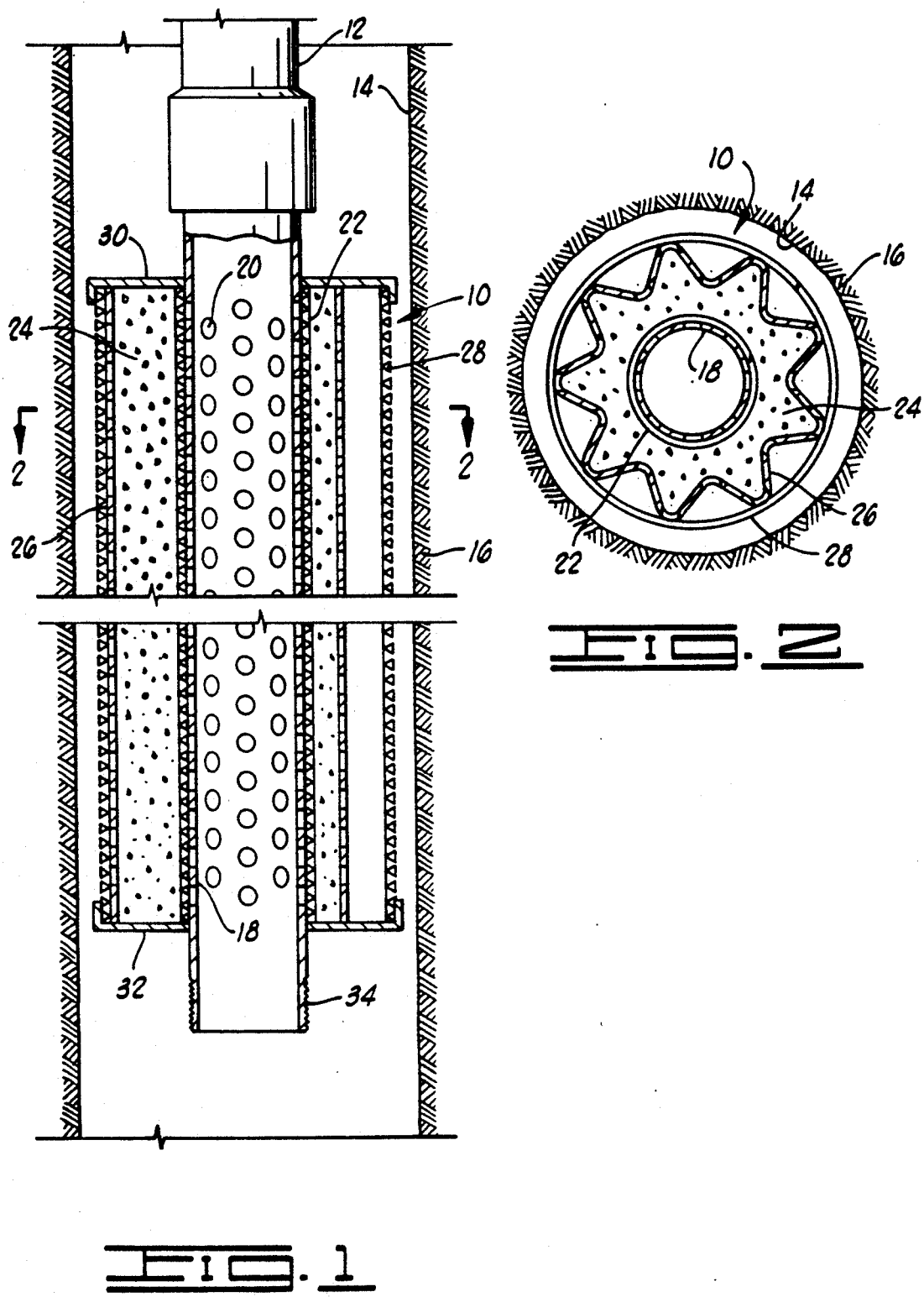

WELL SCREEN WITH INCREASED OUTER SURFACE AREA

BACKGROUND OF THE INVENTION

1. Field of the Invention

This invention relates to a production of oil and/or gas from subterranean wellbores, and more particularly to prepacked well screens for preventing production of sand and other fine solids during production of oil and gas.

When oil and gas wells are drilled through formations which generally are of an unconsolidated nature, the produced fluids can be expected to contain some particulate matter, generally referred to as "sand". It is undesirable to produce such particulate matter with the production fluids because of abrasion of production tubing, valves and other equipment used to produce the well. It is therefore necessary in such instances to avoid production of such sand and other particulate matter with the fluids.

2. The Prior Art

In the past, those skilled in the art have reduced the production of sand by "gravel packing" the well during completion operations. Such gravel packing includes providing on the production conduit or tubular work string a device including a slotted or ported cylindrically shaped member which prevents the passage of solid particles exceeding a predeterminable size. Such devices are incorporated where gravel packing is placed in the annular area between the production conduit or workstring and the casing of the well, or in the event of non-cased wells, the well bore wall, with the gravel being deposited longitudinally exteriorly of the slotted or ported cylindrical member.

Gravel packing of such wells has also been effected by means of incorporation onto the production or workstring of a prepacked well screen, wherein gravel, glass beads, bauxite, or other solid particulate is disposed between an outer member, such as stainless steel wire wrap screen, and an inner ported member, such that the device may be lowered into the well and positioned adjacent the production zone to thereby prevent the particulate matter produced with the production fluids from entering the interior of the conduit and being produced to the top of the well with the production fluids.

The prior art contains a number of references to well screens incorporating slotted, ported or wire-wrapped screen devices which have disposed therein particulate matter, such as glass beads, gravel and the like.

U.S. Pat. No. 4,917,183 describes a gravel pack screen having fluid permeable particulate solids surrounded by a mesh support.

U.S. Pat. No. 4,821,800 describes a filter assembly including a filtering medium supported between a perforated production pipe and an outer mesh screen.

U.S. Pat. No. 4,487,259 describes a prepacked well screen similar in some respects to those described above.

In each of the devices described above, the outer surface of the filtering medium is coextensive with the surface of the outer supporting means surrounding the filtering medium. Since flow capacity through the filtering medium is proportional to the surface area, the outer surface of the outer filtering medium is a limiting factor. In the device shown in U.S. Pat. No. 4,487,259, the flow capacity of the filtering medium is further restricted by the outer casing member.

SUMMARY OF THE INVENTION

According to the present invention, a well screen is provided which prevents sand and other fine solids from the producing formation from entering the production tubing. Additionally, the invention provides an increased surface area for flow, thus reducing the plugging of the outer surface and extending the life of the well screen beyond that provided by prior art devices. This is accomplished by shaping the filter medium to have an outer surface area greater than the surface area of the outer supporting means of the well screen.

THE DRAWINGS

FIG. 1 is a side elevational view, partially cut away, showing a well screen in accordance with the invention.

FIG. 2 is a cross sectional view taken along 2—2 of FIG. 1 and illustrating the unique shape of the filter medium in accordance with a preferred embodiment of the invention.

DESCRIPTION OF THE PREFERRED EMBODIMENTS

In FIG. 1, a well screen 10 is shown attached to the end of a production tubing 12 extending into wellbore 14 adjacent a producing zone 16. FIG. 1 depicts a vertical well, but the well screen is equally useful in deviated and horizontal wells.

The well screen is comprised of an inner perforated pipe section 18 having a series of openings 20 along its length. Openings 20 may be round, oblong, or other shape so long as a substantial area for flow is provided and structural integrity is maintained.

Surrounding perforated pipe section 18 is a wrapped inner screen 22 preferably of the type used in conventional gravel pack systems. Screen 22 may be a spiral strip of triangular cross section formed about perforated pipe 18 such that a flow space exists between adjacent windings.

A filter medium 24 which may be a permeable resin-consolidated sand, a fibrous medium, or other suitable material which is non-reactive with well fluids and well treatment chemicals at well conditions surrounds screen 22. A stabilizing screen 26 covering the outer surface of filter medium 24 is preferably included to provide structural and dimensional stability to the filter medium.

Finally, stabilizing screen 26 is surrounded by a rigid outer support 28 which is shown as a spiral strip of triangular cross section wherein adjacent windings are separated to provide a flow space, the separation being sized to prevent inflow of larger particles. Alternatively, the outer support could be a slotted pipe.

The entire assembly is capped by top cap 30 and bottom cap 32. The caps may be welded to perforated pipe 18 after assembly, or otherwise attached.

The lower end of perforated pipe 18 is shown with threads 34 for attachment of a plug or other device as may be desired.

The essential feature of the invention, wherein the outer surface of filter medium 24 has a greater surface area than that of the cylindrical surface generated by outer support 28, is best illustrated in FIG. 2.

FIG. 2 shows formation 16, outer support 28, stabilizing screen 26, filter medium 24, inner screen 22, and perforated pipe 18. As seen in FIG. 2, the outer surface of filter medium 24 has a radius varying from near the outer support 28 to about one half the distance between inner screen 22 and outer support 28. As shown, the outer surface of filter medium 24 is a longitudinally fluted surface. Other shapes could be used, so long as the total outer surface of filter element 24 is greater than the surface of the cylinder formed by outer support 28. In an alternate embodiment, the filter medium may be in the form of a series of stacked permeable disks some of which have a smaller outer diameter than the diameter of the outer supporting means. This again provides an outer surface area for the overall filter medium which is larger than the surface area of the cylinder formed by the outer support.

The manner of use of the well screen of this invention is essentially the same as that of prior art well screens. The well screen is typically run in on the end of a production tubing, and a packer (not shown) above the well screen is activated to seal off the annulus between the production tubing and the well casing (not shown) extending to near the production zone. Oil and/or gas from the production zone surrounding the well screen flows through the well screen into the production tubing. The filter medium in the well screen prevents sand and other fine solids from being produced with the oil and gas.

By having a larger filter outer surface area, the well screen of this invention allows increased flow and increased time before plugging of the filter occurs.

We claim:

1. In a prepacked well screen assembly comprising a perforated pipe section, an inner screen covering the outer surface of said perforated pipe section, a filter medium surrounding said inner screen and having an inner surface and an outer surface, and a rigid outer supporting means surrounding said filter medium, said supporting means providing a flow path from the exterior thereof to the outer surface of said filter medium and defining a generally cylindrical surface about said filter medium; the improvement wherein said outer surface of said filter medium has a longitudinally fluted surface having a greater area than does the portion of said cylindrical surface defined by said supporting means surrounding said filter medium.

2. A prepacked well screen as defined in claim 1 wherein said filter medium is formed of fibrous material which is non-reactive with well fluids and well treatment materials.

3. A prepacked well screen as defined in claim 1 wherein said filter medium is a permeable consolidated granular medium.

4. A prepacked well screen as defined in claim 1 wherein said outer surface of said filter medium is covered by a stabilizing screen.

5. A prepacked well screen as defined in claim 1 wherein said filter medium is comprised of a plurality of stacked permeable disks and wherein at least one of said permeable disks has an outer diameter less than the diameter of said supporting means surrounding said filter medium.

* * * * *